(12) United States Patent
Furuta et al.

(10) Patent No.: US 8,940,852 B2
(45) Date of Patent: Jan. 27, 2015

(54) METHOD FOR MANUFACTURING REACTIVE POLYSILOXANE SOLUTION

(75) Inventors: Naomasa Furuta, Aichi (JP); Akinori Kitamura, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 48 days.

(21) Appl. No.: 13/996,760

(22) PCT Filed: Dec. 14, 2011

(86) PCT No.: PCT/JP2011/078908
§ 371 (c)(1),
(2), (4) Date: Sep. 4, 2013

(87) PCT Pub. No.: WO2012/090708
PCT Pub. Date: Jul. 5, 2012

(65) Prior Publication Data
US 2013/0338286 A1    Dec. 19, 2013

(30) Foreign Application Priority Data
Dec. 28, 2010    (JP) ................................. 2010-292005

(51) Int. Cl.
| C08G 77/20 | (2006.01) |
| C08K 5/05 | (2006.01) |
| C08G 77/14 | (2006.01) |
| C08G 77/34 | (2006.01) |

(52) U.S. Cl.
CPC . *C08K 5/05* (2013.01); *C08F 77/06* (2013.01); *C08G 77/14* (2013.01); *C08G 77/20* (2013.01); *C08G 77/34* (2013.01)
USPC .............. 528/32; 524/317; 524/585; 528/25; 528/31

(58) Field of Classification Search
USPC ......................... 524/317, 585; 528/25, 31, 32
See application file for complete search history.

(56) References Cited

U.S. PATENT DOCUMENTS

2011/0071255 A1    3/2011 Ooike et al.

FOREIGN PATENT DOCUMENTS

| JP | 6 32903 | 2/1994 |
| JP | 2003-321545 A | 11/2003 |
| JP | 2004-162060 A | 6/2004 |
| JP | 2005-126592 A | 5/2005 |
| WO | 2009 131038 | 10/2009 |

OTHER PUBLICATIONS

International Search Report Issued Apr. 3, 2012 in PCT/JP11/78908 Filed Dec. 14, 2011.
U.S. Appl. No. 13/996,828, filed Jun. 21, 2013, Kitamura, et al.
Combined Chinese Office Action and Search Report issued Apr. 22, 2014 in Patent Application No. 201180051751.0 (with English language translation and English Translation of Category of Cited Documents).

*Primary Examiner* — Edward Cain
(74) *Attorney, Agent, or Firm* — Oblon, Spivak, McClelland, Maier & Neustadt, L.L.P.

(57) ABSTRACT

The present invention is a method for manufacturing a reactive polysiloxane solution, the method comprising: a condensation process for hydrolyzing and copolycondensing a starting compound containing an organosilicon compound having a reactive functional group selected from a (meth)acryloyl group and an oxetanyl group, and also having a siloxane bond-forming group to synthesize a reactive polysiloxane represented by general formula (1); a dissolution process for dissolving the obtained reactive polysiloxane in an organic solvent for water washing; and a washing process for bringing the obtained organic solution and water in contact with each other to remove the water layer from the mixed liquid. The organic solvent for water washing that is used is a compound (e.g., propylene glycol mono butyl ether, 1-pentanol) including a hydroxyl group, having a boiling point at 1 atm of 110° C.-200° C., and a solubility of 10 g or less in 100 g of water at 20° C.

(1)

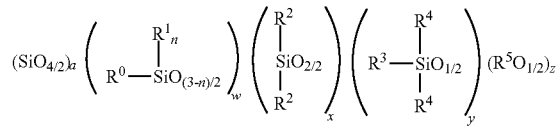

14 Claims, No Drawings

METHOD FOR MANUFACTURING REACTIVE POLYSILOXANE SOLUTION

FIELD OF THE INVENTION

The present invention relates to a method for producing a polymer solution in which a reactive polysiloxane having a reactive functional group selected from a (meth)acryloyl group and an oxetanyl group is dissolved in an organic solvent. A curable composition containing the reactive polysiloxane may produce a cured film with excellent heat resistance, and the like.

BACKGROUND ART

It is desirable that a chemical material is industrially excellent in storage stability, and does not show a change in form or property even when stored for a long time. In general, a polysiloxane having a reactive functional group such as a (meth)acryloyl group may be partially crosslinked, and may show a decrease in solubility in an organic solvent (or may become insoluble in an organic solvent) during storage singly. When the polysiloxane is stored as a polymer solution, a gel of the polysiloxane may be generated, or an insolubilized component may be precipitated in the solution. In particular, unfavorable failure is that gelation or insolubilization is occurred after the polysiloxane synthesis process (e.g., concentration process or dilution process), and the target product is not obtained.

Patent Literature 1 discloses a method for producing a polysiloxane macromonomer having a reactive functional group such as a (meth)acryloyl group. Patent Literature 1 states that condensation may be progressed with time, and a gel or the like may be generated when subjecting an alkoxysilane to hydrolysis and condensation using a catalyst that is dissolved in the system. Patent Literature 1 also states that it is possible to use an organic solvent such as an alcohol, a ketone, and an ether during the production process, but it is preferable to remove the organic solvent from the system during or after the production process, and that a polymer may precipitate when an alcohol produced as a by-product during condensation or the organic solvent remains in the system.

Patent Literature 2 discloses a method for producing a reactive polysiloxane which has a reactive functional group such as a (meth)acryloyl group, and is capable of being dissolved in an organic solvent. The method includes the following six processes.
First step: A raw material containing an organosilicon compound A1 having a (meth)acryloyl group and a hydrolyzable group, and a silicon compound B1 in which four siloxane bond-forming groups are bonded to the silicon atom, is subjected to hydrolysis and copolycondensation under alkaline conditions so that the amount of the silicon compound B1 is 0.3 to 1.8 mol based on 1 mol of the organosilicon compound A1.
Second step: The reaction liquid obtained by the first step is neutralized using an acid.
Third step: A volatile component is removed from the neutralized liquid obtained by the second step.
Fourth step: A concentrate obtained by the third step is mixed with (brought into contact with) an organic solvent for water washing to dissolve at least the condensation product in the organic solvent for water washing.
Fifth step: An organic liquid obtained by the fourth step is washed with water to obtain an organic solution containing the condensation product.
Sixth step: A volatile component is removed from the organic solution obtained by the fifth step.

Patent Literature 2 states that it is preferable to use an organic solvent that can dissolve the condensation product, and is easily separated from water as the organic solvent for water washing used in the fourth step. And is described that preferable organic solvent for water washing is a ketone such as methyl isobutyl ketone, an ether such as diisopropyl ether, an aromatic hydrocarbon such as toluene, an aliphatic hydrocarbon such as hexane, an ester such as ethyl acetate, and the like.

Patent Literature 2 describes that a curable composition can be prepared when an organic solvent and an additional component are added to the condensation product (reactive polysiloxane) obtained by the sixth step. In the Patent Literature 2, an alcohol such as ethanol and isopropyl alcohol, an alkylene glycol monoalkyl ether such as propylene glycol monomethyl ether, an aromatic compound such as toluene and xylene, an ester such as propylene glycol monomethyl ether acetate, ethyl acetate, and butyl acetate, a ketone such as acetone, methyl ethyl ketone, and methyl isobutyl ketone, an ether such as dibutyl ether, and N-methylpyrrolidone are described as examples of the organic solvent that can dissolve the condensation product (reactive polysiloxane).

If ethyl acetate is used as the organic solvent for water washing and as the organic solvent used to prepare the curable composition in Patent Literature 2, a solution composition can be produced without removing the organic solvent for water washing in the sixth step, and adding an organic solvent differing from the organic solvent for water washing to prepare a curable composition (solvent substitution step). This makes it possible to reduce the amount of energy, the production cost, and the production time when producing a curable composition. However, when coating an article with the resulting curable composition, it is necessary to select a compound that does not erode the surface of the article as the organic solvent used to prepare the curable composition. Therefore, the type of organic solvent is limited. For example, ethyl acetate erodes a substrate containing polycarbonate or the like and is not favorable. It was surprisingly found that a curable composition that is prepared using ethyl acetate as an organic solvent for water washing, and is not subjected to a solvent substitution step, tends to generate a gel during long-term storage.

As described above, a reactive polysiloxane which has a reactive functional group and is capable of being dissolved in an organic solvent, and a method for producing such a reactive polysiloxane are known in the art. A method in which a reactive polysiloxane is diluted with an organic solvent to prepare a polymer solution, and a method in which an additional component is added to a polymer solution to prepare a curable composition are also known in the art. Since different functions or properties are required for the organic solvent for water washing and the diluting organic solvent, it may be impossible to use a common organic solvent as the organic solvent for water washing and the diluting organic solvent.

PRIOR ART LITERATURE

Patent Literature

Patent Literature 1: JP A H6-32903
Patent Literature 2: WO2009/131038

DISCLOSURE OF THE INVENTION

Problem that the Invention is to Solve

An object of the present invention is to provide a method for the production of a polymer solution containing a reactive polysiloxane that has a reactive functional group selected from a (meth)acryloyl group and an oxetanyl group, does not generate a gel during a concentration process, or a dilution process, that is performed after synthesizing the reactive polysiloxane in a condensation process, and exhibits excellent storage stability.

Means for Solving the Problem

The present inventors found that a reactive polysiloxane solution having excellent storage stability can be obtained when an organic solvent for water washing having a hydroxyl group, and having a boiling point at a pressure of 1 atm of between 110° C. and 200° C. and a solubility in 100 g of water at a temperature of 20° C. of 10 g or less is utilized in the production method of a reactive polysiloxane solution including a condensation process in which a raw material containing an organosilicon compound having a siloxane bond-forming group and a reactive functional group selected from a (meth)acryloyl group and an oxetanyl group is subjected to hydrolysis and copolycondensation to synthesize a reactive polysiloxane represented by the following general formula (1), a dissolution process in which the obtained reactive polysiloxane is dissolved in an organic solvent for water washing, and a washing process in which the obtained organic solution is brought into contact with water to obtain a mixed liquid, and a water layer is removed from the mixed liquid to collect an oil layer containing the reactive polysiloxane. The inventors also found that the resulting polymer solution exhibits excellent storage stability when the method further includes a concentration process in which a solvent is removed so that part of the organic solvent for water washing included in the oil layer (i.e., a reactive polysiloxane solution containing the organic solvent for water washing) collected by the washing process remains in the reactive polysiloxane solution. Specifically, the inventors found a convenient method for producing a reactive polysiloxane solution that does not require solvent substitution after the washing process.

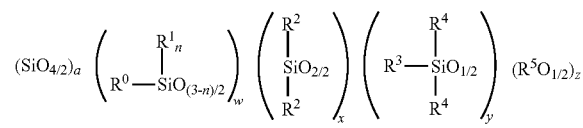

(1)

(In the general formula (1), $R^0$ is an organic group having a functional group selected from a methacryloyl group, an acryloyl group, and an oxetanyl group, $R^1$ is an organic group that includes at least one functional group having 1 to 10 carbon atoms, $R^2$, $R^3$, and $R^4$ are independently a hydrogen atom or a hydrocarbon group having 1 to 10 carbon atoms, $R^5$ is a hydrocarbon group having 1 to 6 carbon atoms, n is 0 or 1, each of a, w, x, y, and z is a number of moles, provided that w is a positive number, each of a, x, y, and z is 0 or a positive number, and $0 \leq a/w \leq 3$, $0 \leq x/(a+w) \leq 2$, $0 \leq y/(a+w) \leq 2$, and $0 \leq z/(a+w+x+y) \leq 1$ are satisfied.)

Effect of the Invention

The reactive polysiloxane solution obtained by the production method of the present invention includes an organic solvent for water washing as part or the entirety of the medium, and is excellent in storage stability. According to the production method of the present invention, a polysiloxane solution can be smoothly produced without causing gelation during the concentration process, dilution process, or the like that is performed after synthesizing the reactive polysiloxane in the condensation process. Since the concentration process can be provided after the washing process, it is possible to easily produce a reactive polysiloxane solution having the desired concentration by diluting the reactive polysiloxane solution using the same organic solvent for water washing. This makes it possible to reduce the amount of energy, production cost, and production time when producing the reactive polysiloxane solution. Since the organic solvent for water washing such as propylene glycol monobutyl ether, 1-pentanol, 2-methyl-1-butanol, and 1-octanol does not erode a resin or the like, a curable composition prepared by adding an additive or the like to the polymer solution may suitably be applied to the surface of a resin-containing member.

EMBODIMENT FOR CARRYING OUT THE INVENTION

Hereinafter, the present invention will be described in detail. Note that, "(meth)acryl" means acryl and methacryl, "(meth)acrylate" means acrylate and methacrylate, and "(meth)acryloyl group" means acryloyl and methacryloyl, in the specification.

The reactive polysiloxane produced by the present invention is represented by the following general formula (1). The reactive polysiloxane is specifically a polymer obtained by subjecting a raw material containing an organosilicon compound to hydrolysis and copolycondensation, the organosilicon compound having a siloxane bond-forming group and a reactive functional group selected from a (meth)acryloyl group and an oxetanyl group described later.

$$(SiO_{4/2})_a \left( \underset{R^0—SiO_{(3-n)/2}}{R^1_n} \right)_w \left( \underset{R^2}{\overset{R^2}{SiO_{2/2}}} \right)_x \left( \underset{R^4}{\overset{R^4}{R^3—SiO_{1/2}}} \right)_y (R^5O_{1/2})_z \quad (1)$$

The term "siloxane bond-forming group" refers to a group that forms a siloxane bond through hydrolysis and condensation (e.g., hydrolyzable group and hydroxyl group). Examples of the siloxane bond-forming group include a hydroxyl group, a halogeno group, an alkoxy group, and the like. Among these, an alkoxy group is preferable since the alkoxy group exhibits excellent hydrolyzability, and does not produce an acid as a by-product. An alkoxy group having 1 to 3 carbon atoms is more preferable. This explanation applies to $R^{11}$ in the general formula (5) and the like.

In the general formula (1), $R^0$ is an organic group having a functional group selected from a methacryloyl group, an acryloyl group, and an oxetanyl group, $R^1$ is an organic group that includes at least one functional group having 1 to 10 carbon atoms, $R^2$, $R^3$, and $R^4$ are independently a hydrogen atom or a hydrocarbon group having 1 to 10 carbon atoms, $R^5$ is a hydrocarbon group having 1 to 6 carbon atoms, n is 0 or 1, each of a, w, x, y, and z is a number of moles, provided that w is a positive number, each of a, x, y, and z is 0 or a positive number, and $0 \leq a/w \leq 3$, $0 \leq x/(a+w) \leq 2$, $0 \leq y/(a+w) \leq 2$, and $0 \leq z/(a+w+x+y) \leq 1$ are satisfied.

In the general formula (1), $R^0$ is an organic group selected from an organic group represented by the following general formulae (2) and (3).

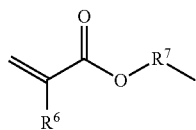

(2)

(In the formula (2), $R^6$ is a hydrogen atom or a methyl group, and $R^7$ is an alkylene group having 1 to 6 carbon atoms.)

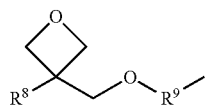

(3)

(In the formula (3), $R^8$ is a hydrogen atom or an alkyl group having 1 to 6 carbon atoms, and $R^9$ is an alkylene group having 1 to 6 carbon atoms.)

Specifically, the reactive polysiloxane is a polymer that has a structural unit represented by the following general formula (12), and may have structural units represented by the following general formulae (11) and (13) to (15). According to the production method of the present invention, a reactive polysiloxane having further a silanol group may be produced.

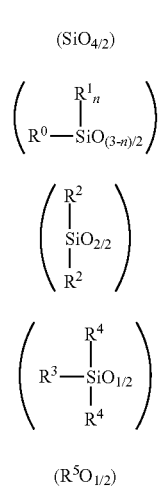

The structural unit represented by the general formula (11) has four Si—O— bonds, and is referred to as "Q structure". A raw material that forms the Q structure through condensation is referred to as "Q monomer". The Q monomer is a tetrafunctional silicon compound having the siloxane bond-forming group, such as a tetraalkoxysilane and a tetrahalogenosilane. Examples of the preferable tetraalkoxysilane include a tetraalkoxysilane including an alkoxy group having 1 to 3 carbon atoms, such as tetramethoxysilane (TMOS), tetraethoxysilane, tetra-1-propoxysilane, and tetra-2-propoxysilane. Examples of the preferable tetrahalogenosilane include tetrachlorosilane and the like.

The reactive polysiloxane according to the present invention may be the polysiloxane represented by the general formula (1) wherein a=0. Specifically, the reactive polysiloxane according to the present invention may be a polysiloxane that does not have the structural unit represented by the general formula (11).

The structural unit represented by the general formula (12) is a structural unit having a reactive functional group which is derived from an organosilicon compound represented by the following general formula (5).

(5)

(In the formula (5), $R^0$ is an organic group represented by a general formula (2) or (3), $R^1$ is an organic group that includes at least one functional group having 1 to 10 carbon atoms, $R^{11}$ is a siloxane bond-forming group, and n is 0 or 1.)

$R^7$ in the general formula (2) and $R^9$ in the general formula (3) are preferably a propylene group. This is because the organosilicon compound represented by the general formula (5) used as a raw material leading to the structural unit represented by the general formula (12) having such an organic functional group is easily available, or can be easily synthesized. $R^6$ is preferably a methyl group, and $R^8$ is preferably an ethyl group.

A reactive polysiloxane when $R^0$ is the organic group represented by the general formula (2) is radically polymerizable, and a reactive polysiloxane when $R^0$ is the organic group represented by the general formula (3) is cationically polymerizable. The reactive polysiloxane according to the present invention may be a compound having the organic group represented by the general formula (2) and the organic group represented by the general formula (3) in the polymer chain. Additionally, the polymer solution according to the present invention may contain a polymer having the structure represented by the general formula (2) and a polymer having the structure represented by the general formula (3). The polymer solution preferably contains at least a reactive polysiloxane having the structure represented by the general formula (2).

$R^1$ in the general formulae (1) and (5) is an organic group that includes at least one functional group having 1 to 10 carbon atoms. $R^1$ is preferably selected from an organic group that includes an alkyl group having 1 to 6 carbon atoms, an organic group that includes an aralkyl group having 7 to 10 carbon atoms, and an organic group that includes an aryl group having 6 to 10 carbon atoms. A plurality of $R^1$s may be either identical or different in the case where a plurality of $R^1$s is present.

In the general formulae (1), (5), and (12), n is 0 or 1. When n is 0, the structural unit represented by the formula (12) has three Si—O— bonds, and is referred to as "T structure". When n is 1, the structural unit represented by the formula (12) has two Si—O— bonds, and is referred to as "D structure". A trifunctional organosilicon compound having three siloxane bond-forming groups in the molecule, and leading to the T structure through condensation is referred to as "T monomer", and a bifunctional organosilicon compound having two siloxane bond-forming groups in the molecule, and leading to the D structure through condensation is referred to as "D monomer". The T monomer and the D monomer are included in the compound represented by the general formula (5).

When a reactive polysiloxane in which the content of the structural unit represented by the general formula (11) in the polysiloxane molecule is relatively high is applied to a curable composition, hardness and heat resistance of the resulting cured product are improved. If the content of the structural unit is too high, the polysiloxane tends to be insolubilized, the viscosity of the polymer solution may be increased, and handling may be difficult. Specifically, the ratio (molar ratio "a/w") of the structural unit represented by the general formula (11) to the structural unit represented by the general formula (12) has a preferable range. In the present invention, it is 0≤a/w≤3. The above range differs depending on the type of the structural unit (12).

When the structural unit represented by the general formula (12) has a methacryloyl group or an acryloyl group as $R^0$, the ratio is preferably 0.3≤a/w≤1.8, more preferably 0.8≤a/w≤1.8, and particularly 1.0≤a/w≤1.8.

When the structural unit represented by the general formula (12) has an oxetanyl group as $R^0$, the ratio is preferably 0.3≤a/w≤2.8, and more preferably 0.8≤a/w≤2.5.

The ratio is also preferably within the above range when the structural unit in which $R^0$ is an oxetanyl group and the structural unit in which $R^0$ is a (meth)acryloyl group are included in one molecule.

The preferable range of the ratio (molar ratio "a/w") differs as described above since the hydrolysis reactivity of the raw material forming the structural unit represented by the general formula (12) differs depending on the type of the side chain, and the range in which a good balance with the structural unit represented by the general formula (11) can be obtained also differs. A reactive polysiloxane having the desired composition is normally obtained by setting the compositional ratio of the raw material to be equal to the ratio of the corresponding structural units, as long as a specific raw material is not consumed due to gelation or the like.

In the reactive polysiloxane represented by the general formula (1), a ratio of the inorganic moiety containing no carbon atoms to the organic moiety containing a carbon atom is not particularly limited. When it is desired to increase the content of the inorganic moiety, it is preferable that the content of the T structure (i.e., the structural unit represented by the general formula (12) wherein n is 0) is high. When it is desired to improve the solubility of the reactive polysiloxane in an organic solvent, it is preferable that the content of the D structure (i.e., the structural unit represented by the general formula (12) wherein n is 1) is high. The polymer solution according to the present invention may include a reactive polysiloxane that includes the structural unit having the T structure and the structural unit having the D structure in the same molecule, or may include the reactive polysiloxane having the T structure and the reactive polysiloxane having the D structure. The ratio of the T structure to the D structure can be determined by the ratio of the raw material used when synthesizing the reactive polysiloxane. A ratio of the T structure to the D structure is appropriately selected depending on the application of the reactive polysiloxane. In the present invention, the reactive polysiloxane is preferably a polysiloxane wherein the average value of n in the general formula (1) is 0 to 0.5, and more preferably a polysiloxane wherein the average value of n in the general formula (1) is 0 to 0.3.

Examples of the T monomer include 2-acryloxyethyltrimethoxysilane, 2-acryloxyethyltriethoxysilane, 3-acryloxypropyltrimethoxysilane, 3-acryloxypropyltriethoxysilane, 2-methacryloxyethyltrimethoxysilane, 2-methacryloxyethyltriethoxysilane, 3-methacryloxypropyltrimethoxysilane, 3-methacryloxypropyltriethoxysilane, 3-ethyl-3-((3-(trimethoxysilyl)propoxy)methyl)oxetane, 3-ethyl-3-((3-(triethoxysilyl)propoxy)methyl)oxetane, 3-methyl-3-((3-(trimethoxysilyl)propoxy)methyl)oxetane, and the like.

Examples of the D monomer include 2-acryloxyethyldimethoxymethylsilane, 2-acryloxyethyldiethoxyethylsilane, 3-acryloxypropyldimethoxymethylsilane, 3-acryloxypropyldiethoxyethylsilane, 2-methacryloxyethyldimethoxypropylsilane, 2-methacryloxyethyldiethoxybutylsilane, 3-methacryloxypropyldimethoxymethylsilane, 3-methacryloxypropyltriethoxymethylsilane, 3-ethyl-3-((3-(dimethoxymethylsilyl)propoxy)methyl)oxetane, 3-ethyl-3-((3-(dimethoxyethylsilyl)propoxy)methyl)oxetane, 3-methyl-3-((3-(dimethoxymethylsilyl)propoxy)methyl)oxetane, and the like.

$R^2$ in the general formulae (1) and (13) is a hydrogen atom or a hydrocarbon group having 1 to 10 carbon atoms. $R^2$ is preferably a methyl group or a phenyl group, and more preferably a methyl group having low steric hindrance. Two $R^2$s may be either identical or different. When the two $R^2$ are different, the two $R^2$ may be a methyl group and a phenyl group.

Examples of an organosilicon compound that forms the structural unit represented by the general formula (13) include dimethoxymethylsilane, dimethoxydimethylsilane, dimethoxymethylphenylsilane, dimethoxydiphenylsilane, diethoxymethylsilane, diethoxydimethylsilane, diethoxymethylphenylsilane, diethoxydiphenylsilane, and the like.

The structural units (11), (12), and (13) are included in the reactive polysiloxane so that 0≤x/(a+w)≤2 (preferably 0≤x/(a+w)≤1) is satisfied. Specifically, the reactive polysiloxane may or may not have the structural unit represented by the general formula (13).

$R^3$ and $R^4$ in the general formulae (1) and (14) are independently a hydrogen atom or a hydrocarbon group having 1 to 10 carbon atoms. $R^3$ is preferably a methyl group, an ethyl group, a propyl group, or a phenyl group, and more preferably a methyl group. $R^4$ is preferably a methyl group, an ethyl group, or a propyl group, and more preferably a methyl group. $R^3$ and two $R^4$ in the general formulae (1) and (14) may be identical hydrocarbon groups, or may be different hydrocarbon groups.

The structural units (11), (12), and (14) are included in the reactive polysiloxane so that 0≤y/(a+w)≤2 (preferably 0≤y/(a+w)≤1) is satisfied. Specifically, the reactive polysiloxane may or may not have the structural unit represented by the general formula (14).

The structural unit represented by the formula (14) has one Si—O— bond, and is referred to as "M structure". The M structure blocks the terminal of the condensation chain of the polysiloxane. When the molecular weight of the reactive polysiloxane is controlled, it is preferable to use a raw material (M monomer) having only one siloxane bond-forming group, and leading to the M structure through condensation.

Examples of the M monomer include methoxytrimethylsilane, ethoxytrimethylsilane, methoxytriethylsilane, hydroxytrimethylsilane, hexamethyldisiloxane, and the like.

$R^5$ in the general formulae (1) and (15) is an alkyl group having 1 to 6 carbon atoms. $R^5$ is preferably a methyl group, an ethyl group, or a propyl group, more preferably a propyl group, and further preferably a n-propyl group.

The structural unit (15) is a structural unit derived from the organosilicon compound (S1) and the silicon compound (S2). The structural unit (15) is formed, for example, when the siloxane bond-forming group is not reacted, and polycondensation is not progressed in the condensation process.

The structural units (11) to (15) are included in the reactive polysiloxane so that 0≤z/(a+w+x+y)≤1 (preferably 0.01≤z/(a+w+x+y)≤0.5) is satisfied.

The method for producing a reactive polysiloxane solution of the present invention includes a condensation process in which a raw material containing an organosilicon compound having a siloxane bond-forming group and a reactive functional group selected from a (meth)acryloyl group and an oxetanyl group, specifically a compound represented by the general formula (5) is subjected to hydrolysis and copolycondensation to synthesize a reactive polysiloxane, a dissolution process in which the obtained reactive polysiloxane is dissolved in an organic solvent for water washing, and a washing process in which the obtained organic solution is brought into contact with water to obtain a mixed liquid, and a water layer is removed from the mixed liquid to collect an oil layer containing the reactive polysiloxane. As mentioned above, the compound represented by the general formula (5) is a T monomer or a D monomer that is an organosilicon compound having a reactive functional group and a siloxane bond-forming group. The raw material normally further includes a Q monomer.

In the condensation process, copolycondensation is normally conducted in a solvent in the presence of a catalyst. An alcohol having 1 to 3 carbon atoms such as methanol, ethanol, 1-propanol, and 2-propanol, tetrahydrofuran, acetone, or the like is used as the reaction solvent.

The catalyst may be an acidic catalyst or a basic catalyst, but is preferably a basic catalyst. Examples of the basic catalyst include ammonia, organic amines, tetramethylammonium hydroxide, tetraethylammonium hydroxide, tetrapropylammonium hydroxide, tetrabutylammonium hydroxide, choline, sodium hydroxide, potassium hydroxide, calcium hydroxide, and the like. Among these, an ammonium compound having a quaternary nitrogen atom that exhibits excellent catalytic activity is preferable, and tetramethylammonium hydroxide is more preferable.

The condensation process is preferably performed while adding a mixture including a Q monomer and the catalyst to a reactor containing a T monomer and/or a D monomer. Alternatively, the condensation process may be performed while separately adding a Q monomer and the catalyst to a reactor containing a T monomer and/or a D monomer, or adding water and the catalyst to a reactor containing a T monomer and/or a D monomer, and a Q monomer. Part of the catalyst may be placed in the reactor in advance.

When the catalyst is a basic catalyst, it is preferable that $R^2$ in the organosilicon compound that forms the structural unit (13), and $R^3$ and $R^4$ in the organosilicon compound that forms the structural unit (14), are not hydrogen atoms and are hydrocarbon groups having 1 to 10 carbon atoms.

The amount of water used for hydrolysis is preferably 0.5 to 10 equivalents based on 1 equivalent of the siloxane bond-forming group included in the raw material.

When the usage amount of the Q monomer and the amount of the T monomer and/or the D monomer are respectively referred to as a mol and w mol, the monomers are used so that the molar ratio "a/w" is 3 or less. The raw materials that form the structural units (13) and (14) are used in the following selected ratio. The usage amounts of the raw material that forms the structural unit (13), the Q monomer, and the T monomer and/or the D monomer are preferably selected so that $0 \leq x/(a+w) \leq 2$ (preferably $0 \leq x/(a+w) \leq 1$) is satisfied.

The usage amounts of the raw material that forms the structural unit (14), the Q monomer, and the T monomer and/or the D monomer are preferably selected so that $0 \leq y/(a+w) \leq 2$ (preferably $0 \leq y/(a+w) \leq 1$) is satisfied.

Preferable embodiment for the production method of the present invention includes a neutralization process in which the obtained reaction liquid by the condensation process is neutralized, and a desolvation process in which an organic solvent including an alcohol produced by the condensation process as a by-product is removed.

The "reaction temperature" used in connection with the production method of the present invention refers to the temperature of the reaction liquid in the process (condensation process) that subjects the raw material to copolycondensation. Since copolycondensation is conducted using an acidic catalyst or a basic catalyst, the reaction temperature is substantially the temperature of the reaction liquid until the neutralization process in which the obtained reaction liquid by the condensation process is neutralized ends. The "reaction time" refers to the time elapsed until the neutralization process ends after completion of the mixing of the T monomer or the D monomer with the Q monomer. It is convenient to perform the condensation process while keeping a constant temperature. The inventors found that it is difficult to control the condensation reaction, and the energy cost increases if the reaction temperature is too high, and that a methacryloyl group or an acryloyl group decomposes if the reaction temperature is too high. The inventors further found that the reaction time increases, and gelation easily occurs during the reaction if the reaction temperature is too low. The upper limit of the reaction temperature is preferably 100° C., more preferably 80° C., and further preferably 60° C. The lower limit of the reaction temperature is preferably 0° C., more preferably 15° C., and further preferably 30° C. taking account of the possibility that the reaction liquid is frozen. The reaction temperature may be constant throughout the reaction, or may be increased during the reaction. For example, when using a basic catalyst such as tetramethylammonium hydroxide, it is also preferable to set the reaction temperature at a low temperature (e.g., 30° C.), and gradually increase the reaction temperature while adding the Q monomer to a reactor containing the T monomer and/or the D monomer. It is preferable to adjust the reaction temperature to the preset temperature when adding the Q monomer.

In the condensation process, a condensation rate of the raw material is preferably 92% or more by mol, more preferably 95% or more by mol, and further preferably 98% or more by mol. It is most preferable that substantially all of the siloxane bond-forming groups (including a hydrolyzable group) be condensed. The upper limit of the condensation rate is normally 99.9% by mol. Therefore, the reactive polysiloxane solution produced by the production method of the present invention may include a reactive polysiloxane in which a hydrolyzable group that is not condensed remains in the structure represented by the general formula (1). The hydrolyzable group residue rate is preferably 8% or less by mol, and more preferably 2% or less by mol.

When the siloxane bond-forming group (including a hydrolyzable group) remains in the reactive polysiloxane, the siloxane bond-forming group residue rate can be calculated from the integral ratio of each signal in the $^1$H-NMR (nuclear magnetic resonance spectrum) chart. It can be determined that substantially all of the hydrolyzable groups have been condensed when almost no signal based on the hydrolyzable group is observed in the $^1$H-NMR chart of the resulting reactive polysiloxane.

The production method of the present invention preferably includes, as mentioned above, the neutralization process in which the obtained reaction liquid containing the reactive polysiloxane by the condensation process is neutralized. Since the reactive polysiloxane never deteriorates in the case of using a neutralized reaction liquid, the reactive polysiloxane can be dissolved directly in the organic solvent for water washing in the dissolution process, and subjected to the washing process. In the condensation process, when a raw material in which the siloxane bond-forming group is an alkoxy group is used, an alcohol that is derived from the alkoxy group and has a number of carbon atoms corresponding to the number of carbon atoms in the alkoxy group is produced as a by-product. When using an alcohol as the reaction solvent, the alcohol is contained in the reaction liquid. In particular, when an alcohol having 1 to 3 carbon atoms remains in the organic solution obtained by the dissolution process, oil/water separation in the washing process tends to be hindered. Therefore, in the case of using an organosilicon compound that includes an alkoxy group having 1 to 3 carbon atoms in the condensation process as the raw material, the desolvation process is preferably provided in which an alcohol in the reaction liquid is removed before the dissolution process. When the neutralization process is conducted, it is preferable to subject the neutralized reaction liquid obtained by the neutralization process to the desolvation process. The desolvation process improves the yield in the washing process. In the desolvation process, part or the entirety of water, or part or the entirety of an organic compound having a boiling point at 1 atm of lower than 110° C. may also be removed in addition to an alcohol. The concentration of the reactive polysiloxane in the reaction liquid obtained by the desolvation process is preferably in the range from 20% to 90% by mass.

The organic solvent for water washing used in the washing process is a compound that has a hydroxyl group, and has a boiling point at 1 atm of between 110° C. and 200° C., and a solubility in 100 g of water at 20° C. of 10 g or less. The organic solvent for water washing is a compound that is capable of dissolving a reactive polysiloxane, and preferably forms an oil layer containing the reactive polysiloxane, which can be easily separated from a water layer in the washing process. Since the organic solvent for water washing may be used as at least part of the medium of the resulting polysiloxane solution, it is preferable that the organic solvent for water washing is a compound that has a moderate vapor pressure, and does not erode the resin.

The number of hydroxyl groups included in the organic solvent for water washing is preferably 1 or more, and more preferably 1. The boiling point of the organic solvent for water washing is preferably in the range from 130° C. to 180° C. In the case of an organic solvent having a boiling point of lower than 110° C., since the difference in boiling point from water, a by-product alcohol produced during hydrolysis, and the like is small, water or a by-product alcohol may not be smoothly removed by distillation, being unfavorable. On the other hand, if an organic solvent having a boiling point of higher than 200° C. is used, the concentration process for adjustment of the concentration of the reactive polysiloxane, and the like may be hindered after the washing process, and further, it may be difficult to remove the washing organic solvent from a coating liquid when a curable composition is prepared, being unfavorable. The "solubility in water" used herein refers to the amount of the organic solvent for water washing that can be uniformly dissolved in 100 g of water at a temperature of 20° C. based on a normal definition. For example, since propylene glycol monomethyl ether (PGM) is uniformly mixed with an arbitrary amount of water, the solubility of propylene glycol monomethyl ether in water is expressed as infinite. Since propylene glycol monobutyl ether is dissolved in 100 g of water in an amount of 6 g, the solubility of propylene glycol monobutyl ether is 6.

Specific examples of a preferable organic solvent for water washing include 1-octanol, 1-pentanol, 2-methyl-1-butanol, and propylene glycol monobutyl ether. Among these, 1-pentanol, and propylene glycol monobutyl ether are more preferable. Particularly preferred is a propylene glycol monobutyl ether. The organic solvent for water washing may be used singly or in combination of two or more types thereof.

The usage amount of the organic solvent for water washing is preferably in the range from 20 to 500 parts by mass, and more preferably from 50 to 200 parts by mass based on 100 parts by mass of the theoretical production amount of the reactive polysiloxane from the viewpoint of water/oil separation capability in the washing process and a reduction in cost.

The washing process is a process in which an organic solution which is obtained by the dissolution process and contains the reactive polysiloxane dissolved in the organic solvent for water washing, is brought into contact with water to obtain a mixed liquid, and a water layer is removed from the mixed liquid. Specifically, the washing process is a process in which the mixed liquid is separated into an oil layer and a water layer so that the water-soluble component contained in the organic solution is transitioned to the water layer, and the water layer is removed from the oil layer containing the reactive polysiloxane. The oil layer can be collected by the washing process to obtain a polysiloxane solution in which the reactive polysiloxane is dissolved in the organic solvent for water washing. The concentration of the reactive polysiloxane in the polysiloxane solution (oil layer) is normally 50% or more by mass, and the polysiloxane solution may include water, an organic compound, and the like. The polysiloxane solution mainly includes the organic solvent for water washing as the medium. In small-scale production, water and an organic solution may be brought into contact with each other (or mixed) using a separating funnel, and a water layer may be discharged from the bottom of the separating funnel. In this case, the addition of water and the discharge of the water layer may be repeated until the water-soluble component is sufficiently removed from the oil layer. The water layer may be made acidic or alkaline depending on the removal target water-soluble component. A method using an aqueous solution of an inorganic salt is also known. A counter-current extraction system or the like that utilizes the same principle may be used on an industrial scale. The production method of the present invention may utilize an arbitrary method. Examples of water that is preferably used in the washing process include deionized water, a saturated sodium chloride solution, and the like. It is possible to use a publicly known aqueous component that is normally used to wash an organic polymer.

When the collected polysiloxane solution (oil layer) includes water, an organic compound, and the like, the production method of the present invention preferably includes a concentration process in which a solvent is removed so that part of the organic solvent for water washing included in the collected polysiloxane solution (oil layer) remains in the reactive polysiloxane solution. In this case, it is preferable to completely remove an organic compound having a boiling point at 1 atm of lower than 110° C. This makes it possible to allow the organic solvent for water washing to make up the entirety of the medium, and easily adjust the concentration of the reactive polysiloxane within the desired range.

The concentration of the reactive polysiloxane in the reaction liquid obtained by the washing process tends to be high. It is industrially efficient when the concentration of the reactive polysiloxane is high. The organic solvent for water washing is advantageous in that the organic solvent for water washing can dissolve the reactive polysiloxane at a high concentration, however, the polymers may undergo a crosslinking reaction. When the concentration of the reactive polysiloxane is low, a situation in which the polymers undergo a crosslinking reaction is suppressed. This is advantageous from the viewpoint of storage stability. In order to adjust the concentration of the reactive polysiloxane within the desired range, it is preferable to use the same organic solvent for water washing as that used in the washing process for the concentrated polysiloxane solution obtained by the concentration process (this process refers to as dilution process). The concentration of the reactive polysiloxane in the polymer solution obtained by the production method of the present invention is preferably in the range from 0.1% to 80% by mass, more preferably from 1% to 70% by mass, and further preferably from 10% to 60% by mass.

The polymer solution obtained by the production method of the present invention may optionally include an additional organic solvent. The additional organic solvent is a compound that dissolves the reactive polysiloxane and is preferably a compound having one alcoholic hydroxyl group such as an alkyl alcohol and a propylene glycol monoalkyl ether. Specific examples of the additional organic solvent include methanol, ethanol, 1-propanol, isopropyl alcohol, 1-butanol, isobutyl alcohol, t-butyl alcohol, 3-methyl-1-butanol, 2,2-dimethyl-1-propanol, 2-pentanol, 3-methyl-2-butanol, 3-pentanol, 2-methyl-2-butanol, cyclopentanol, propylene glycol monomethyl ether (PGM), propylene glycol monoethyl ether (PGE), propylene glycol monopropyl ether (PGP), and the like. The additional organic solvent may be used as a diluting organic solvent.

In the polymer solution obtained by the production method of the present invention, the content ratio of the organic solvent for water washing is preferably in the range from 1% to 100% by mass based on the total content of the organic solvent. The content ratio thereof is more preferably from 50% to 100% by mass, and particularly 100% by mass.

The number average molecular weight (Mn) of the reactive polysiloxane can be calculated as a standard polystyrene equivalent by performing gel permeation chromatography (GPC) at a temperature of 40° C. using tetrahydrofuran (THF) as a carrier solvent, for example. Mn of the reactive polysiloxane is preferably in the range from 500 to 100,000, more preferably from 1,000 to 50,000, and further preferably from 2,000 to 20,000.

In the production method of the present invention, the reactive polysiloxane obtained by the condensation process is washed using the specific organic solvent for water washing. Various compounds such as alkanes may be used when the organic solvent is merely required to have a boiling point of 110° C. or lower and exhibit low solubility in water. However, since an organosilicon compound normally has low affinity to a carbon-based organic solvent, it is difficult to expect a preferable solvent that can dissolve the polysiloxane represented by the general formula (1).

The inventors found that a specific organic solvent exhibiting low solubility in water in spite of the presence of a hydroxyl group can dissolve the polysiloxane represented by the general formula (1), and is suitable for the washing process. It is considered that the production method of the present invention suppresses gelation of the polysiloxane since a small amount of siloxane bond-forming groups that remain in the polysiloxane included in the polymer solution reacts with the hydroxyl group of the organic solvent for water washing, and the organic solvent for water washing molecules serve as a protecting group to prevent gelation of the remaining siloxane bond-forming groups due to crosslinking. Since a molecule that exhibits low solubility in water in spite of the presence of a hydroxyl group is normally bulky and has high hydrophobicity, it is likely that such a molecule serves as a protecting group. However, it is considered that a person having ordinary skill in the art could not have expected that an organic solvent for water washing would have such an effect.

The polymer solution produced by the production method of the present invention may contain a reactive polysiloxane having a siloxane bond-forming group (e.g., hydrolyzable group) derived from the raw material, the organic solvent for water washing, the other organic solvent, and the like in addition to the reactive polysiloxane represented by the general formula (1). A liquid having an organic solvent in an amount sufficient to completely dissolve the reactive polysiloxane is referred to as "polymer solution". The polymer solution may be used to prepare a curable composition or the like by incorporating an additional component so long as the storage stability of the polymer solution is not impaired. Examples of the additional component include a polymerizable unsaturated compound, an epoxy compound, a radical polymerization inhibitor, an antioxidant, a UV absorber, a light stabilizer, a leveling agent, an organic polymer, a filler, metal particles, a pigment, a polymerization initiator, a sensitizer, an organic solvent, and the like.

The polymerizable unsaturated compound is preferably a compound having an acryloyl group or a methacryloyl group (hereinafter referred to as "(meth)acrylate compound") or the like in order to adjust the properties (e.g., hardness, mechanical strength, chemical resistance, and adhesion) of a cured product formed using the curable composition, obtain a cured film which is excellent in adhesion to a substrate, and adjust the viscosity, curability, and the like of the curable composition, for example.

Examples of the (meth)acrylate compound include a monofunctional (meth)acrylate, a polyfunctional (meth)acrylate, a urethane (meth)acrylate, and the like. These compounds may be used singly or in combination of two or more types thereof.

The epoxy compound is not particularly limited as to properties including molecular structure, molecular weight and the like. A publicly known epoxy compound may be used. Specific examples of the epoxy compound include bisphenol A-type epoxy resins, derivatives thereof, phenol novolac epoxy resins, cresol novolac epoxy resins, 3,4-epoxycyclohexylmethyl-3,4-epoxycyclohexyl carboxylate, 2-(3,4-epoxycyclohexyl-5,5-spiro-3,4-epoxy)cyclohexane-m-dioxane, bis(3,4-epoxycyclohexylmethyl)adipate, vinylcyclohexeneoxide, 4-vinylepoxycyclohexane, bis(3,4-epoxy-6-methylcyclohexylmethyl)adipate, 3,4-epoxy-6-methylcyclohexyl carboxylate, methylenebis(3,4-epoxycyclohexane), dicyclopentadiene diepoxide, ethylene glycol di(3,4-epoxycyclohexylmethyl)ether, ethylenebis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, triglycidyl ether of glycerol, triglycidyl ether of trimethylolpropane, tetraglycidyl ether of sorbitol, hexaglycidyl ether of dipentaerythritol, diglycidyl ether of polyethylene glycol, diglycidyl ether of polypropylene glycol, a polyglycidyl ether of a polyether polyol obtained by adding one or more alkylene oxides to an aliphatic polyhydric alcohol such as propylene glycol or glycerol, monoglycidyl ether of an aliphatic long-chain dibasic acid aliphatic higher alcohol, monoglycidyl ether of phenol, cresol, and butylphenol, monoglycidyl ether of a polyether alcohol obtained by adding an alkylene oxide to phenol, cresol, or butylphenol, glycidyl ester of a higher fatty acid, epoxidized soybean oil, octyl epoxystearate, butyl epoxystearate, epoxidized linseed oil, epoxidized polybutadiene, ethylene oxide, propylene oxide, cyclohexene oxide, styrene oxide, methyl glycidyl ether, butyl glycidyl ether, allyl glycidyl ether, phenyl glycidyl ether, ethylene glycol glycidyl phenyl ether, ethylene glycol benzyl glycidyl ether, diethylene glycol glycidyl tetrahydropyranyl ether, glycidyl methacrylate, glycidyl acetate, a silicone epoxy, and the like. Some or all of the hydrogen atoms of these epoxy compounds may be substituted with a fluorine atom. The epoxy compound may be used singly or in combination of two or more types thereof. It is preferable to use an epoxy compound having 2 or more epoxy groups. For example, 1,6-hexanediol diglycidyl ether, 3,4-epoxycyclohexylmethyl-3,4-epoxycyclohexyl carboxylate, and the like are preferable as the epoxy compound.

Examples of the radical polymerization inhibitor include a phenol-based compound such as hydroquinone and hydroquinone monomethyl ether, N-nitrosophenylhydroxylamine salt, and the like.

Examples of the antioxidant include a hindered phenol antioxidant such as 2,6-di-t-butyl-4-methylphenol and pentaerythritol tetrakis(3-(3,5-di-t-butyl-4-hydroxyphenyl)propionate), a sulfur-based secondary antioxidant such as 4,6-bis(octylthiomethyl)-o-cresol, a phosphorus-based secondary antioxidant, and the like. These antioxidants may be used singly or in combination of two or more types thereof.

When the polymer solution includes a radical polymerization inhibitor or an antioxidant, the storage stability, thermal stability, and the like of the reactive polysiloxane and the polymer solution can be improved.

When the polymer solution includes the radical polymerization inhibitor, the content of the radical polymerization inhibitor in the polymer solution is preferably in the range from 1 to 10,000 parts by mass, more preferably from 10 to 2,000 parts by mass, and further preferably from 100 to 500 parts by mass based on 1,000,000 parts by mass of the reactive polysiloxane.

When the polymer solution includes the antioxidant, the content of the antioxidant in the polymer solution is preferably in the range from 1 to 10,000 parts by mass, more preferably from 10 to 2,000 parts by mass, and further preferably from 100 to 500 parts by mass based on 1,000,000 parts by mass of the reactive polysiloxane.

Examples of the organic polymer as other component which may be included in the polymer solution include a (meth)acrylic polymer, an epoxy polymer, and the like. Examples of a preferable monomer forming these polymers include methyl methacrylate, cyclohexyl(meth)acrylate, N-(2-(meth)acryloxyethyl)tetrahydrophtalimide, and the like.

Examples of the filler as other component include a silica particle, an alumina particle, and the like.

When the polymer solution obtained by the present production method is used, an active energy ray-curable composition or a heat-curable composition can be prepared. An initiator is appropriately selected and added to the composition depending on the intended use of the composition.

EXAMPLES

The present invention is further described below by ways of Examples. Note that the present invention is not limited to the following examples.

The number average molecular weight (Mn) was determined as follows. The polymer solution was subjected to gel permeation chromatography (GPC) at a temperature of 40° C. using GPC columns "TSK-Gel G4000H" and "TSK-Gel G2000H" (manufactured by Tosoh Corporation) connected in series and THF as an eluant, and the molecular weight was calculated from the retention time using standard polystyrene.

The reactive polysiloxane was subjected to $^1$H-NMR analysis as follows. About 1 g of the measurement sample and about 100 mg of hexamethyldisiloxane (HMDSO) as an internal standard substance were accurately weighed, and dissolved in deuterated chloroform as an analysis solvent, and analysis was performed based on the signal intensity of the proton of HMDSO.

Table 1 shows properties of the organic solvent for water washings used in Examples and Comparative Examples. Note that "PGB" stands for propylene glycol monobutyl ether, "PGM" stands for propylene glycol monomethyl ether, "IBA" stands for isobutyl alcohol, "MEK" stands for methyl ethyl ketone, "MIBK" stands for methyl isobutyl ketone, and "MAK" stands for methyl amyl ketone.

TABLE 1

| Organic solvent for water washing | Hydroxyl group (in molecule) | Boiling point (° C.) | Solubility (g/100 g (water)) |
|---|---|---|---|
| PGB | One alcoholic hydroxyl group | 170 | 6 |
| 1-Pentanol | One alcoholic hydroxyl group | 140 | 2.1 |
| PGM | One alcoholic hydroxyl group | 121 | Infinite |
| IBA | One alcoholic hydroxyl group | 108 | 8.7 |
| Ethyl acetate | No | 77 | 8 |
| MEK | No | 80 | 23 |
| MIBK | No | 118 | 1.8 |
| MAK | No | 151 | 0.4 |

1. Production and Evaluation of Reactive Polysiloxane and Polymer Solution

In Examples and Comparative Examples, the "alcohol-substituted TMOS liquid" obtained in Reference Example 1 was used as the Q monomer.

Reference Example 1

Some of the methoxy groups of tetramethoxysilane (TMOS) were substituted with a 1-propoxy group as described below. A flask was charged with 43.39 g of 1-propanol and 38.06 g (250 mmol) of tetramethoxysilane. Subsequently, 12.76 g of a methanol solution of 25% by mass of tetramethylammonium hydroxide (containing 299 mmol of methanol and 35 mmol of tetramethylammonium hydroxide) was slowly added to the mixture while stirring, and these were reacted at a temperature of 25° C. for 15 minutes or more. The reaction liquid was then subjected to gas chromatography with FID detector to detect n-propoxy group-containing tetraalkoxysilanes, containing a compound in which at least one methoxy group of TMOS is substituted with an n-propoxy group (e.g., 1-substituted product, 2-substituted product, 3-substituted product, and 4-substituted product), and unreacted TMOS. The number of substitutions with 1-propanol (i.e., the average number of n-propoxy groups per molecule of the n-propoxy group-containing compound) was calculated based on the peak area of the product determined from the gas chromatogram, and found to be 1.6. The content of the n-propoxy group-containing tetraalkoxysilane and the content of unreacted TMOS were respectively 93% by mass and 7% by mass based on 100% by mass of the total content of these compounds. A ratio of the total content of the n-propoxy group-containing tetraalkoxysilane and unreacted TMOS to the reaction liquid was 52% by mass. The reaction liquid is hereinafter referred to as "alcohol-substituted TMOS liquid" and is used in Examples or Comparative Examples.

Example 1

A flask was charged with 0.003 g of aluminum N-nitrosophenylhydroxylamine "Q-1301" (trade name) manufactured by Wako Pure Chemical Industries, Ltd. as a polymerization inhibitor, and 62.09 g (250 mmol) of 3-methacryloxypropyltrimethoxysilane as T monomer. Subsequently, 75.13 g of 1-propanol and 31.53 g of water were added thereto. The liquid temperature was set to 60° C., and then 94.21 g of the alcohol-substituted TMOS liquid containing tetramethylammonium hydroxide prepared in Reference Example 1 was added dropwise to the mixture over 1 hour while stirring. Stirring was further continued at 60° C., and the reaction was terminated after 2 hours had elapsed. The alcohol-substituted TMOS liquid was added dropwise using a pump at a rate as constant as possible.

Next, 8.27 g of a methyl ethyl ketone (MEK) solution of 20% by mass of oxalic acid (containing 18.38 mmol of oxalic acid) was added to the reaction liquid while keeping the reaction liquid at 60° C. to neutralize tetramethylammonium hydroxide which is a catalyst. The mixture was cooled down to 30° C. or lower for concentrating the neutralized liquid, and the flask was installed in a solvent removal system. 180 g of 1-propanol, methanol, water, MEK, and the like in total were distilled off under reduced pressure while keeping the mixture at 40° C. or lower to obtain 86 g of a concentrate containing about 70% by mass of polysiloxane (P1) and mainly containing 1-propanol and water as medium. The maximum degree of vacuum reached was 1 mmHg.

After that, 75 g of propylene glycol monobutyl ether (PGB) was added to the concentrate, and the mixture was stirred to obtain a homogeneous solution. 90 g of an aqueous solution of 20% by mass of sodium chloride was then added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 90 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, 0.003 g of aluminum N-nitrosophenylhydroxylamine as a polymerization inhibitor was added to the oil layer mainly containing the polysiloxane (P1) and PGB. The resultant mixed liquid was heated under reduced pressure to evaporate part of the solvent, and 114 g of a transparent and colorless reactive polysiloxane solution (C1) was obtained. After evaporating 0.6 g of the polymer solution (C1) to dryness at 100° C. for 1 hour, the solid content was calculated from the weight of the thy substance, and found to be 52% by mass. The yield of the polysiloxane (P1) based on the solid content was 61 g. When the solvent contained in the polymer solution (C1) was analyzed by gas chromatography with TCD detector, only a peak attributed to PGB was detected.

The reactive polysiloxane (P1) had Mn of 7,700. The polysiloxane (P1) contained in the polymer solution (C1) was subjected to $^1$H-NMR analysis. It was confirmed that a methacryloyl group was present in the polysiloxane (P1).

The amount of the methacryloyl group was quantitatively determined by $^1$H-NMR analysis using the proton of HMDSO (hexamethyldisiloxane) as an internal standard. The content of the structural unit (11) in the polysiloxane (P1) was calculated based on the determination result, and found to be 25% by mass. It was thus confirmed that the reactive polysiloxane (P1) was a polymer represented by the general formula (1) wherein a, w, x, y, and z are respectively 1, 1, 0, 0, and 0.25, and was a copolycondensation product obtained by the stoichiometric reactions between the raw materials.

Example 2

A reactive polysiloxane solution (C2) was obtained in the same manner as those in Example 1, except that 75 g of 1-pentanol was used instead of 75 g of propylene glycol monobutyl ether (PGB) that was added to 86 g of the concentrate containing the polysiloxane (P1). The reactive polysiloxane (P1) had Mn of 7,400. When the solvent contained in the polymer solution (C2) was analyzed by gas chromatography with TCD detector, only a peak attributed to 1-pentanol was detected.

Example 3

A reactive polysiloxane solution (C3) was obtained in the same manner as those in Example 1, except that the reaction temperature when using the alcohol-substituted TMOS liquid containing tetramethylammonium hydroxide was set to 80° C. instead of 60° C., and the mixture was stirred at 80° C. for 2 hours instead of stirring the mixture at 60° C. for 2 hours. The reactive polysiloxane (P1) had Mn of 7,000. When the solvent contained in the polymer solution (C3) was analyzed by gas chromatography with TCD detector, only a peak attributed to propylene glycol monobutyl ether was detected.

Example 4

A reactive polysiloxane solution (C4) was obtained in the same manner as in Example 1, except that the reaction temperature when using the alcohol-substituted TMOS liquid containing tetramethylammonium hydroxide was set to 30° C. instead of 60° C., and the mixture was stirred at 30° C. for 2 hours instead of stirring the mixture at 60° C. for 2 hours. The reactive polysiloxane (P1) had Mn of 11,000. When the solvent contained in the polymer solution (C4) was analyzed by gas chromatography with TCD detector, only a peak attributed to propylene glycol monobutyl ether was detected.

Example 5

A flask [A] was charged with 114.17 g (750 mmol) of tetramethoxysilane, 139.21 g (500 mmol) of 3-ethyl-3-((3-(trimethoxysilyl)propoxy)methyl)oxetane (hereinafter referred to as "TMSOX"), and 189.38 g of 1-propanol. The mixture was stirred while bubbling nitrogen into the mixture. The liquid temperature was set to 40° C., and then 31.90 g of a methanol solution of 25% by mass of tetramethylammonium hydroxide (containing 747 mmol of methanol and 87.5 mmol of tetramethylammonium hydroxide) was added dropwise to the liquid over 5 minutes while stirring. In other words, the flask was initially charged with the Q monomer all together and the Q monomer was not used dropwisely. Note that the internal temperature need not be 40° C. when the methanol solution of tetramethylammonium hydroxide is added dropwise to the mixture.

After confirming that the internal temperature of the flask [A] was stable at 40° C., a mixed liquid of 81.07 g of purified water and 81.07 g of 1-propanol (that was separately prepared in a flask [B]) was added dropwise to the flask [A] over 1 hour using a pump. The dropwise addition rate was made constant as much as possible. The internal temperature started to increase when 5 minutes had elapsed after the start of addition until the internal temperature reached about 60° C. The addition of the mixed liquid was completed and then the mixture was stirred at about 60° C. for 6 hours. 20.7 g of a methyl ethyl ketone (MEK) solution of 20% by mass of oxalic acid (containing 45.94 mmol of oxalic acid) was added to the reaction liquid while keeping the internal temperature at about 60° C. to neutralize tetramethylammonium hydroxide which is a catalyst. The mixture was cooled down to 30° C. or lower for concentrating the neutralized liquid, and the flask [A] was installed in a solvent removal system. 382 g of 1-propanol, methanol, water, MEK, and the like in total were distilled off under reduced pressure while keeping the mixture at 40° C. or lower to obtain 259 g of a concentrate containing about 58% by mass of polysiloxane (P2). The maximum degree of vacuum reached was 3 mmHg.

After that, 187 g of propylene glycol monobutyl ether (PGB) was added to the concentrate, and the mixture was stirred to obtain a homogeneous solution. 210 g of an aqueous solution of 20% by mass of sodium chloride was then added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 210 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, the oil layer mainly containing the polysiloxane (P2) and PGB was heated under reduced pressure to evaporate part of the solvent, and 252 g of a transparent and colorless reactive polysiloxane solution (C5) was obtained. After evaporating 0.6 g of the polymer solution (C5) to dryness at 100° C. for 1 hour, the solid content was calculated from the weight of the dry substance, and found to be 59% by mass. The yield of the polysiloxane (P2) based on the solid content was 150 g. When the solvent contained in the polymer solution (C5) was analyzed by gas chromatography with TCD detector, only a peak attributed to PGB was detected.

The reactive polysiloxane (P2) had Mn of 4,800. The polysiloxane (P2) contained in the polymer solution (C5) was subjected to $^1$H-NMR analysis. It was confirmed that an oxetanyl group was present in the polysiloxane (P2).

The amount of oxetanyl group was quantitatively determined by $^1$H-NMR analysis using the proton of HMDSO (hexamethyldisiloxane) as an internal standard. The content of the structural unit (11) in the polysiloxane (P2) was calculated based on the determination result, and found to be 30% by mass. It was thus confirmed that the reactive polysiloxane (P2) was a polymer represented by the general formula (1) wherein a, w, x, y, and z are respectively 1.5, 1, 0, 0, and 0.18, and was a copolycondensation product obtained by the stoichiometric reactions between the raw materials.

Comparative Example 1

A synthesis was tried in the same manner as those in Example 1, except that 75 g of propylene glycol monomethyl ether (PGM) was used instead of 75 g of propylene glycol monobutyl ether (PGB) that was added to 86 g of the concentrate containing polysiloxane. Since the oil layer and the water layer were not sufficiently separated in the washing process, a reactive polysiloxane could not be collected.

Comparative Example 2

86 g of the concentrate containing the polysiloxane (P1) prepared in Example 1 was used. 75 g of ethyl acetate was used instead of 75 g of propylene glycol monobutyl ether (PGB) that was added to the concentrate, and then the mixture was stirred to obtain a homogeneous solution. 90 g of an aqueous solution of 20% by mass of sodium chloride was further added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 90 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, 0.003 g of aluminum N-nitrosophenylhydroxylamine as a polymerization inhibitor was added to the oil layer mainly containing the polysiloxane (P1) and ethyl acetate. 160 g of PGM was then added thereto and the resultant mixed liquid was heated under reduced pressure to evaporate part of the solvent, and a transparent and colorless reactive polysiloxane solution (D2) containing PGM as a medium was obtained. The solid content in the polymer solution (D2) was calculated and found to be 67% by mass.

The reactive polysiloxane (P1) had Mn of 7,300. The polysiloxane (P1) contained in the polymer solution (D2) was subjected to $^1$H-NMR analysis. It was confirmed that a methacryloyl group was present in the polysiloxane (P1).

Comparative Example 3

86 g of the concentrate containing the polysiloxane (P1) prepared in Example 1 was used. 75 g of methyl ethyl ketone (MEK) was used instead of 75 g of propylene glycol monobutyl ether (PGB) that was added to the concentrate, and then the mixture was stirred to obtain a homogeneous solution. 90 g of an aqueous solution of 20% by mass of sodium chloride was further added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 90 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, 0.003 g of aluminum N-nitrosophenylhydroxylamine as a polymerization inhibitor was added to the oil layer mainly containing the polysiloxane (P1) and MEK. 150 g of PGM was then added thereto and the resultant mixed liquid was heated under reduced pressure to evaporate part of the solvent, and a transparent and colorless reactive polysiloxane solution (D3) containing PGM as a medium was obtained. The solid content in the polymer solution (D3) was calculated and found to be 81% by mass.

The reactive polysiloxane (P1) had Mn of 7,500. The polysiloxane (P1) contained in the polymer solution (D3) was subjected to $^1$H-NMR analysis. It was confirmed that a methacryloyl group was present in the polysiloxane (P1).

Comparative Example 4

259 g of the concentrate containing the polysiloxane (P2) prepared in Example 5 was used. 187 g of methyl isobutyl ketone (MIBK) was used instead of 187 g of propylene glycol monobutyl ether (PGB) that was added to the concentrate, and then the mixture was stirred to obtain a homogeneous solution. 210 g of an aqueous solution of 20% by mass of sodium chloride was further added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 210 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, the oil layer mainly containing the polysiloxane (P2) and MIBK was heated under reduced pressure to evaporate part of the solvent, and a transparent and colorless reactive polysiloxane solution (D3) containing MIBK as a medium was obtained. The solid content in the polymer solution (D3) was 52% by mass.

The reactive polysiloxane (P2) had Mn of 4,900. The polysiloxane (P2) contained in the polymer solution (D3) was subjected to $^1$H-NMR analysis. It was confirmed that an oxetanyl group was present in the polysiloxane (P2).

Comparative Example 5

259 g of the concentrate containing the polysiloxane (P2) prepared in Example 5 was used. 187 g of methyl amyl ketone (MAK) was used instead of 187 g of propylene glycol monobutyl ether (PGB) that was added to the concentrate, and then the mixture was stirred to obtain a homogeneous solution. 210 g of an aqueous solution of 20% by mass of sodium chloride was further added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 210 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, the oil layer mainly containing the polysiloxane (P2) and MAK was heated under reduced pressure to evaporate part of the solvent, and a transparent and colorless reactive polysiloxane solution (D4) containing MAK as a medium was obtained. The solid content in the polymer solution (D4) was 56% by mass.

The reactive polysiloxane (P2) had Mn of 5,000. The polysiloxane (P2) contained in the polymer solution (D4) was subjected to $^1$H-NMR analysis. It was confirmed that an oxetanyl group was present in the polysiloxane (P2).

Comparative Example 6

86 g of the concentrate containing the polysiloxane (P1) prepared in Example 1 was used. 75 g of isobutyl alcohol (IBA) was used instead of 75 g of propylene glycol monobutyl ether (PGB) that was added to the concentrate, and then the mixture was stirred to obtain a homogeneous solution. 90 g of an aqueous solution of 20% by mass of sodium chloride was further added thereto, and the mixture was sufficiently stirred for 5 minutes or longer. When the stirring was stopped, the liquid contained in the flask promptly was separated into two layers. After allowing the mixture to stand for 15 minutes or longer, a water layer was discharged using a tube. According to the water-washing operation, salts and excess acids contained in the concentrate were removed. Subsequently, 90 g of an aqueous solution of 20% by mass of sodium chloride was added to an oil layer, and the mixture was stirred in the same manner as mentioned above to discharge the water layer. The above operation was repeated until the water layer successively showed an identical pH within a range from 4 to 7 three times. The pH was measured by determining a change in color with the naked eye using a triple-zone pH paper. In the final water-washing operation, the water layer was discharged after allowing the mixture to stand for 17 hours. In this example, the water-washing operation was performed seven times in total to complete the washing process.

Next, 0.003 g of aluminum N-nitrosophenylhydroxylamine as a polymerization inhibitor was added to the oil layer mainly containing the polysiloxane (P1) and IBA. The resultant mixed liquid was heated under reduced pressure to evaporate part of the solvent, and 114 g of a transparent and colorless reactive polysiloxane solution (D5) was obtained. The solid content in the polymer solution (D5) was calculated and found to be 51% by mass. When the solvent contained in the polymer solution (D5) was analyzed by gas chromatography with TCD detector, peaks attributed to IBA and 1-propanol were detected. The concentration of 1-propanol was determined to be 8% by mass from the comparison with the peak area of the standard substance. A peak attributed to water was observed. Since the shape of the peak was broad, the quantitative capability was poor. The concentration of water was estimated to be about several percent by mass.

The reactive polysiloxane (P1) had Mn of 7,200. The polysiloxane (P1) contained in the polymer solution (D5) was subjected to $^1$H-NMR analysis. It was confirmed that a methacryloyl group was present in the polysiloxane (P1).

The storage stability of the reactive polysiloxanes obtained in examples except Comparative Example 1 was evaluated by the following method.

The polymer solution was diluted with the diluting solvent shown in Table 2 so that the polysiloxane solid content was 50% by mass, and then prepared solution was subjected to evaluation.

A sample bottle (50 ml) was charged with 20 g of the polymer solution having a solid content of 50% by mass, and then sealed. The sample bottle was kept in a thermostat bath (60° C.). The sample bottle was shaken every 24 hours, and observed with the naked eye. It was determined that gelation had not occurred when the solution flowed swiftly when the sample bottle was turned upside down. It was determined that gelation had occurred when the solution did not flow when the sample bottle was turned upside down. The above evaluation was performed for 7 days, and the number of days until gelation was observed was recorded. When gelation was not observed on the seventh day, the storage stability evaluation test was terminated. The ratio of the viscosity on the seventh day to the viscosity before the storage stability evaluation test was calculated for the polymer solution for which gelation was not observed, to evaluate the storage stability. More specifically, the rotational viscosity at 25° C. was measured using an EDH viscometer (cone radius: 2.4 mm, cone angle: 1.34°). The calculated viscosity ratio is shown in Table 2. A change in viscosity was not observed when the viscosity ratio was 1. A viscosity ratio closer to 1 indicates better storage stability.

According to results shown in Table 2, the polymer solutions (C1) to (C5) obtained in Examples 1 to 5, for which the solid content was adjusted to 50% by mass, did not gel during the storage stability evaluation test (7 days) and exhibited excellent storage stability. In particular, the polymer solutions (C1) to (C3) and (C5) had a viscosity ratio as small as 1.1 to 1.3, and it was confirmed that the production methods used in Examples 1 to 3 and 5 are preferable. In contrast, the polymer solutions (evaluation polymer solutions) (D1), (D2), (D3), and (D4) obtained in Comparative Examples 2, 3, 4, and 5 generated gel on the second day. In these cases, when the sample bottle was shaken on the third day, the solution did not flow due to gelation. The polymer solution (evaluation polymer solution) (D5) obtained in Comparative Example 6 generated gel on the fifth day.

Since PGM used as the organic solvent for water washing in Comparative Example 1 has a solubility in 100 g of water at 20° C. of more than 10 g, the liquid could not be separated into an oil layer and a water layer, and a reactive polysiloxane solution could not be obtained in Comparative Example 1. In Comparative Examples 2 to 5 in which an organic solvent for water washing having no hydroxyl group was used, after the oil layer was collected, and the reactive polysiloxane solution could be obtained. However, gelation occurred on the second day when stored using a specific medium. It is considered that a silanol of the polysiloxane molecule in which the hydrolyzable group is remained became unstable due to an incapability to undergo solvation with a solvent having no hydroxyl group, and underwent condensation between silanol and led to gel. Additionally, in Comparative Example 6 in which an organic solvent for water washing having a hydroxyl group, but having a boiling point of lower than 110° C. was used, after the oil layer could be collected, and the reactive polysiloxane solution could be obtained. Since the difference between the boiling point of the organic solvent for water washing and the boiling point of water was small, the solvent could not be sufficiently removed from the oil layer, and the

TABLE 2

| | Condensation process | | | | Dissolution process | | Storage stability test | |
|---|---|---|---|---|---|---|---|---|
| | Reaction temperature (° C.) | Reaction time (hour) | Dropwise addition time of Q monomer (minute) | Gelation | Organic solvent for water washing | Type and Mn of polysiloxane | Diluting solvent | Viscosity ratio |
| Example 1 | 60 | 2 | 60 | No | PGB | P1 7,700 | PGB | 1.2 |
| Example 2 | 60 | 2 | 60 | No | 1-Pentanol | P1 7,400 | 1-Pentanol | 1.2 |
| Example 3 | 80 | 2 | 60 | No | PGB | P1 7,000 | PGB | 1.1 |
| Example 4 | 30 | 2 | 60 | No | PGB | P1 11,000 | PGB | 1.5 |
| Example 5 | 40-70 | 7 | — | No | PGB | P2 4,800 | PGB | 1.3 |
| Comparative Example 1 | 60 | 2 | 30 | Could not be water washed | PGM | P1 — | — | — |
| Comparative Example 2 | 60 | 2 | 30 | No | Ethyl acetate | P1 7,300 | PGM | Gelled on second day |
| Comparative Example 3 | 60 | 2 | 30 | No | MEK | P1 7,500 | PGM | Gelled on second day |
| Comparative Example 4 | 40-70 | 7 | — | No | MIBK | P2 4,900 | MIBK | Gelled on second day |
| Comparative Example 5 | 40-70 | 7 | — | No | MAK | P2 5,000 | MAK | Gelled on second day |
| Comparative Example 6 | 60 | 2 | 60 | No | IBA | P1 7,200 | IBA | Gelled on fifth day | polymer solution (D5) containing IBA, 1-propanol, and water as medium was obtained. It is considered that the polymer solution diluted with IBA gelled for the above reason on the fifth day when subjected to the storage stability test.

2. Evaluation of Curability of Reactive Polysiloxane

A curable composition was prepared using the polysiloxane obtained in Example, and the curability of the curable composition was evaluated by the following method.

3 parts by mass of 2-hydroxy-2-methyl-1-phenylpropan-1-one as a radical initiator was dissolved in 200 parts by mass of the polymer solution (C1) containing the reactive polysiloxane (P1) and having a solid content of 50% by mass to prepare a curable composition. The curable composition was applied to a polycarbonate plate using a bar coater. The resulting film was heated at a temperature of about 50° C. for 5 minutes to volatilize the solvent to form a film having a thickness of about 10 μm. The film was cured by applying UV rays under the following conditions using an illumination meter (manufactured by EIT). The tackiness of the surface was lost by applying UV rays once, and the curable composition exhibited excellent curability.
(UV irradiation conditions)
Lamp: 80 W/cm high-pressure mercury lamp
Lamp height: 10 cm
Cumulative dose: 210 mJ/cm² (UV-A region)
Atmosphere: air

INDUSTRIAL APPLICABILITY

The polymer solution according to the present invention can be stored for a long time in a solution state, and therefore a change in quality of the polysiloxane during storage, transportation, and the like can be suppressed. The polymer solution according to the present invention can be easily used and is suitable as an industrial material. Since the reactive polysiloxane included in the polymer solution according to the present invention has a reactive group selected from a (meth)acryloyl group and an oxetanyl group, the polysiloxane leads to a curable composition excellent in curability and is industrially useful.

What is claimed is:
1. A method for producing a reactive polysiloxane solution, comprising:
synthesizing a reactive polysiloxane of formula (1) by subjecting a raw material comprising an organosilicon compound, which comprises a siloxane bond-forming group and a reactive functional group selected from the group consisting of a (meth)acryloyl group and an oxetanyl group, to hydrolysis and copolycondensation,
dissolving the reactive polysiloxane in an organic solvent for water washing, thereby obtaining a resultant organic solution, and
bringing the resultant organic solution into contact with water to obtain a mixed liquid, and removing a water layer from the mixed liquid to collect an oil layer comprising the reactive polysiloxane, thereby obtaining the reactive polysiloxane solution,
wherein
the organic solvent for water washing comprises a hydroxyl group, and has a boiling point at a pressure of 1 atm of from 110° C. to 200° C. and a solubility in 100 g of water at a temperature of 20° C. of 10 g or less,

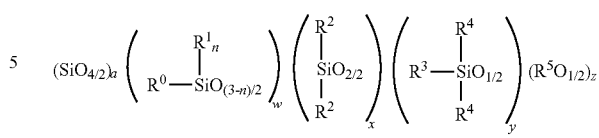

wherein
R⁰ is an organic group of formula (2) or an organic group of formula (3),
R¹ is an organic group that comprises a functional group comprising 1 to 10 carbon atoms,
R², R³, and R⁴ are independently a hydrogen atom or a hydrocarbon group comprising 1 to 10 carbon atoms,
R⁵ is a hydrocarbon group comprising 1 to 6 carbon atoms,
n is 0 or 1, and
a, w, x, y, and z are independently a number of moles, with the proviso that w is a positive number, a, x, y, and z are independently 0 or a positive number, 0≤a/w≤3, 0≤x/(a+w)≤2, 0≤y/(a+w)≤2, and 0≤z/(a+w+x+y)≤1,

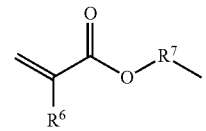

wherein R⁶ is a hydrogen atom or a methyl group, and R⁷ is an alkylene group comprising 1 to 6 carbon atoms,

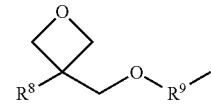

wherein R⁸ is a hydrogen atom or an alkyl group comprising 1 to 6 carbon atoms, and R⁹ is an alkylene group comprising 1 to 6 carbon atoms.
2. The method according to claim 1,
wherein the organic solvent for water washing is at least one compound selected from the group consisting of propylene glycol monobutyl ether, 1-pentanol, 2-methyl-1-butanol, and 1-octanol.
3. The method solution according to claim 2,
further comprising:
removing a solvent from the reactive polysiloxane solution so that part of the organic solvent for water washing in the oil layer comprising the reactive polysiloxane remains in the reactive polysiloxane solution.
4. The method according to claim 2,
wherein the organosilicon compound is a compound of formula (5),

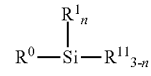

wherein

R⁰ is an organic group of formula (2) or an organic group of formula (3),

R¹ is an organic group that comprises a functional group comprising 1 to 10 carbon atoms, R¹¹ is a siloxane bond-forming group, and n is 0 or 1,

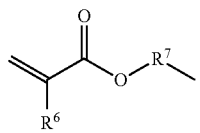
(2)

wherein R⁶ is a hydrogen atom or a methyl group, and R⁷ is an alkylene group comprising 1 to 6 carbon atoms,

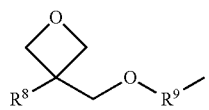
(3)

wherein R⁸ is a hydrogen atom or an alkyl group comprising 1 to 6 carbon atoms, and R⁹ is an alkylene group comprising 1 to 6 carbon atoms.

5. The method according to claim 4,
wherein the raw material comprises a tetraalkoxysilane or a tetrahalogenosilane.

6. The method according to claim 1,
wherein said synthesizing occurs at a reaction temperature of from 30° C. to 80° C.

7. The method according to claim 1,
wherein the reactive polysiloxane has a concentration of from 1% to 70% by mass.

8. The method according to claim 1,
further comprising:

removing a solvent from the reactive polysiloxane solution so that part of the organic solvent for water washing in the oil layer comprising the reactive polysiloxane remains in the reactive polysiloxane solution.

9. The method according to claim 8,
wherein the organosilicon compound is a compound of formula (5),

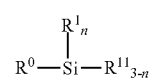
(5)

wherein

R⁰ is an organic group of formula (2) or an organic group of formula (3),

R¹ is an organic group that comprises a functional group comprising 1 to 10 carbon atoms, R¹¹ is a siloxane bond-forming group, and n is 0 or 1,

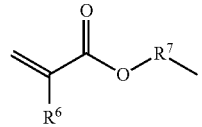
(2)

wherein R⁶ is a hydrogen atom or a methyl group, and R⁷ is an alkylene group comprising 1 to 6 carbon atoms,

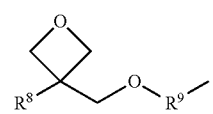
(3)

wherein R⁸ is a hydrogen atom or an alkyl group comprising 1 to 6 carbon atoms, and R⁹ is an alkylene group comprising 1 to 6 carbon atoms.

10. The method according to claim 9,
wherein the raw material comprises a tetraalkoxysilane or a tetrahalogenosilane.

11. The method according to claim 1,
wherein the organosilicon compound is a compound of formula (5),

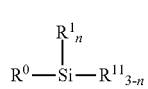
(5)

wherein

R⁰ is an organic group of formula (2) or an organic group of formula (3),

R¹ is an organic group that comprises a functional group comprising 1 to 10 carbon atoms, R¹¹ is a siloxane bond-forming group, and n is 0 or 1,

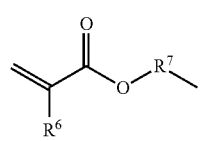
(2)

wherein R⁶ is a hydrogen atom or a methyl group, and R⁷ is an alkylene group comprising 1 to 6 carbon atoms,

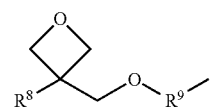
(3)

wherein R⁸ is a hydrogen atom or an alkyl group comprising 1 to 6 carbon atoms, and R⁹ is an alkylene group comprising 1 to 6 carbon atoms.

12. The method according to claim 2,
wherein the raw material comprises a tetraalkoxysilane or a tetrahalogenosilane.

13. The method according to claim 12, wherein $0.3 \leq a/w \leq 1.8$.

14. The method according to claim 6,
further comprising:
removing a solvent from the reactive polysiloxane solution so that part of the organic solvent for water washing in the oil layer comprising the reactive polysiloxane remains in the reactive polysiloxane solution.

* * * * *